3,350,450
PROCESS OF PREPARING AROMATIC AMINES BY THE CATALYTIC HYDROGENATION OF AROMATIC NITRO COMPOUNDS
Frederick S. Dovell, Naugatuck, and Harold Greenfield, Watertown, Conn., assignors to Uniroyal, Inc., a corporation of New Jersey
No Drawing. Filed May 1, 1964, Ser. No. 364,280
20 Claims. (Cl. 260—577)

This application is a continuation-in-part of our co-pending application Ser. No. 301,665, filed Aug. 12, 1963, now abandoned.

The present invention relates to a non-dehalogenating, catalyzed hydrogenation process as well as a new compound formed thereby and the use of said new compound.

It is an object of this invention to provide a hydrogenation process for (1) reducing halo-substituted nitro compounds to halo-substituted primary amines and/or (2) reductively alkylating such primary amines with little, if any, dehalogenation.

It is an object of this invention to provide a hydrogenation process using a catalyst having a long life and a high level of activity even after long exposure to common catalyst poisons, particularly the halogens.

It is another object of this invention to provide a new and useful composition of matter and a method of selectively killing narrow-leaf grasses therewith without harming certain other flora.

Briefly, the present invention comprises effecting non-dechlorinating hydrogenation reactions and/or reductive alkylations in the presence of a catalyst comprising a sulfide of a metal selected from the group consisting of palladium, platinum, rhodium, ruthenium and cobalt and non-debrominating hydrogenation reactions and/or reductive alkylations in the presence of a catalyst comprising a sulfide of a metal selected from the group consisting of platinum, rhodium, ruthenium and cobalt.

Another aspect of the present invention comprises the chemical compound, N-isopropyl-p-chloroaniline, and the use of said compound as a selective post-emergence herbicide for narrow-leaf grasses.

It is well known that the common catalysts such as elemental platinum and palladium cause considerable dehalogenation of halo-substituted aromatic compounds even under very mild hydrogenation conditions. As a matter of fact, "most workers heave considered loss of halogen inevitable in catalytic hydrogenations," Baltzly and Phillips, J. Am. Chem. Soc., 68, 261 (1946). This dehalogenation under hydrogenation conditions is well described in the literature—e.g., Strel'tsova and Zelinskii, Bull. acad. sci. U.R.S.S., Classe sci. chim. 1943, 56–64; C.A., 38, 1214 (1944). Even those catalysts (e.g., copper oxide, rhodium) which have been reported as minimizing the occurrence of dehalogenation still at best produce substantial dehalogenation (from 1 to 5%) as noted in U.S. Patents 2,772,313; 2,791,613; 3,051,753; 3,067,253; and British Patent 859,-251. Although such appreciable dehalogenation may be tolerable in certain product streams (i.e., liquid or gas flows), there are occasions when it is essential that a product stream be essentially (over 99%) halogen free. For instance, the poisoning of hydrogenation catalysts by even small amounts of halogen and halogen compounds is reported, with respect to palladium and platinum catalysts, in Baltzly et al., supra, and, with respect to Raney nickel catalysts, in Lieber and Morritz, "Advances in Catalysts," vol. 5, pages 440–444 (1953).

The catalysts of the instant invention useful in preventing debromination are the sulfides of platinum, rhodium, ruthenium and cobalt.

The catalysts of the instant invention can be prepared by reaction of the metals (e.g., Co, Rh) with hydrogen sulfide, other sulfur-containing compounds or elemental sulfur; by treatment of solutions of appropriate compounds of the metals (e.g., $H_2PtCl_6 \cdot 6H_2O$, $PdCl_2 \cdot 2H_2O$) in dilute acids with hydrogen sulfide; and by other methods known to those skilled in the art of catalyst preparation. The catalysts may be prepared in situ or pre-formed, i.e., added to the hydrogenation reaction mixture after prior preparation and isolation. Typical methods of catalyst preparation are described in our copending U.S. Ser. Nos. 264,691 (filed Mar. 12, 1963), and 285,901 (filed June 6, 1963). A catalyst may be prepared and used as a bulk powder or supported on a suitable carrier, such as carbon or alumina; and, whether supported or not, may be prepared and used as a powder for liquid phase slurry and for vapor phase fluidized reactions, or as a pellet for liquid or vapor phase fixed bed operations.

The catalyzed reductive hydrogenations may be run in reaction zones having temperatures ranging from about 50° to 175° C. or other temperatures as high as the stability of the reactants will permit and at pressures ranging from about 75 to 800 p.s.i.g. or even to several thousand p.s.i.g. The exact conditions of operation will depend, of course, upon the nature of the hydrogenation reaction being carried out as well as the optimum economic combination of temperature, pressure, catalyst level and cycle time. The range of practical catalyst levels is illustrated by the examples given below. Quantitative reactions may often be achieved with as low a weight ratio of catalyst (bulk or supported) to reactant to be hydrogenated as 0.001. The reactions may be carried out in batch or continuous systems, with either tank or pipe-line reactors; and in the liquid phase with slurry or fixed bed catalysts or in the vapor phase with either fluidized or fixed bed catalysts, according to procedures well-known to those skilled in the art of catalysis.

On the basis of a weighted combination of catalyst cost and catalytic activity, the preferred catalysts of the present invention are the sulfides of rhodium, platinum and palladium.

Although halonitrobenzenes were utilized primarily in the examples for ease and simplicity of experimentation and comparison, other aromatic nitro compounds such as nitronaphthalene, whether substituted with one or more like or different halogen atoms, and whether or not also alkyl-substituted, can be used successfully in the process of this invention (examples of such compounds being given in U.S. Patent 3,051,753).

Halo-substituted primary amines, such as those formed by the reduction process of this invention, may be reacted in the presence of the same catalysts (immediately and in situ or after isolation and purification) with carbonyl-containing compounds such as aliphatic or aromatic aldehydes and aliphatic or alkylaryl ketones in reductive alkylation reactions to form corresponding halo-substituted secondary amines. The conditions of reaction and suitable conventional reactants for this general type of reaction are described in "Preparation of Amines by Reductive Alkylation," chapter 3, vol. 4 (by Emerson), of the Organic Reactions Series (John Wiley & Sons, New York City). The reductive hydrogenation and reductive alkylation may be performed in two distinct and separate process steps or in a single process; e.g., a halo-substituted nitro compound (p-nitrochlorobenzene) may be reacted at 50°–200° C. and 75–1600 p.s.i.g. (for example, at 160°–200° C. and 1000–1600 p.s.i.g.) with a carbonyl-containing compound (acetone) in the presence of an appropriate catalyst of the instant invention to produce in a single process first the corresponding halo-substituted primary amine (p-chloroaniline) and then the corresponding halo-substituted secondary amine (N-isopropyl-p-chloroaniline).

The new compound of the instant invention is N-isopropyl-p-chloroaniline and the physical properties thereof are set forth in Example II. It may be used as a selective post-emergence herbicide to kill narrow-leaf grasses in an area containing broad-leaf flora and narrow-leaf gasses, e.g., by spraying on each acre 250 gallons of aqueous solution having a concentration of 2000 parts of the compound per million parts by weight of solution.

The continued reduction of the halo-substituted nitro compounds to the primary amines despite the varying minor extents of obvious dehalogenation (in Example I, Expt. Nos. 12 and 13 for debromination) shows that the instant catalysts do not undergo halogen poisoning.

by distillation. Benzene was then added, and the remaining methanol was removed by distillation. The benzene solution was then cooled, washed with water and separated into a residue and a fraction distilling up to a liquid (pot) temperature of 205° C. at atmospheric pressure. The residue was 85.5 grams (99.5% yield) of p-bromonaniline, melting at 50.5°–61.5° C. (mostly 58.5°–61.5° C.), and did not depress the melting point of an authentic sample of p-bromoaniline. Neither aniline nor any nitro-compound was detected by gas-liquid chromatographic (GLC) analysis of both the distillate and residue.

TABLE I.—REDUCTION OF HALONITROBENZENES TO HALOANILINES

| Expt. No. | X—C$_6$H$_4$—NO$_2$ | | | Catalyst | | Temp., °C. | Pressure, p.s.i.g. | Time, min. | Yield, mole, percent [1] | |
|---|---|---|---|---|---|---|---|---|---|---|
| | X | Wt., g. | Moles | Type | Wt., g. | | | | Haloaniline | Aniline |
| 1 [2] | p-Cl [3] | 315 | 2.0 | Pd [4] | 1.58 | 20–30 | 100–400 | 140 | 56 | 42.5 |
| 2 [5] | p-Cl [3] | 157.6 | 1.0 | Pt sulfide [4] | 1.6 | 130–175 | 500–800 | 45 | [6] 98.5 | ([7]) |
| 3 [5] | p-Cl [3] | 157.6 | 1.0 | Co sulfide [9] | (9) | 110 | 500–800 | 400 | [6] 97 | ([7]) |
| 4 [10] | p-Cl [3] | 17.0 | 0.108 | Pt sulfide [4] | 0.325 | 145 | 500–800 | 195 | [6] 100 | ([7]) |
| 5 [10] | p-Cl [3] | 17.0 | 0.108 | Pd sulfide [11] | 0.325 | 145 | 500–800 | 150 | [6] 100 | ([7]) |
| 6 [2] | o-Cl [12] | 315 | 2.0 | Pd [4] | 1.58 | 20–30 | 100–400 | 40 | 84 | 10 |
| 7 [5] | o-Cl [12] | 157.6 | 1.0 | Pt sulfide [4] | 1.6 | 150–175 | 500–800 | 40 | 94.5 | ([7]) |
| 8 [13] | o-Cl [14] | 78.3 | 0.5 | ....do.[4] | 1.5 | 145 | 500–800 | 70 | 92.5 | ([7]) |
| 9 [13] | o-Cl [14] | 78.3 | 0.5 | Rh sulfide [4] | 1.5 | 100–145 | 500–800 | 15 | 95 | ([7]) |
| 10 [13] | o-Cl [14] | 78.3 | 0.5 | Ru sulfide [4] | 1.5 | 140–150 | 500–800 | 45 | 93.5 | ([7]) |
| 11 [13] | p-Br [15] | 101 | 0.5 | Pt sulfide [4] | 1.5 | 100–130 | 500–800 | 60 | [6] 99.5 | ([7]) |
| 12 [13] | p-Br [15] | 101 | 0.5 | Rh sulfide [4] | 1.5 | 130 | 500–800 | 390 | [6] 100 | Trace |
| 13 [13] | p-Br [15] | 101 | 0.5 | Co sulfide [9] | (9) | 105 | 500–800 | 135 | [6] 99 | Trace |
| | | | | | | 115 | | 90 | | |

[1] Yields determined by quantitative gas-liquid chromatographic (GLC) analyses. No nitro-compound detected in any experiment. Failure of haloaniline and aniline yields to add up to exactly 100% in some cases is probably due to mechanical losses occurring during product isolation and product transferral to and from the autoclave, especially when working with liquids such as o-chloroaniline, as well as to experimental imprecision in measurements.
[2] Experiment run in 1-gallon stirred autoclave with 1,260 ml. methanol as solvent.
[3] Commercially available in a practical grade.
[4] 5 wt. percent metal-on-carbon.
[5] Experiment run in 600-ml. Magne-Dash autoclave with 180 ml. methanol as solvent.
[6] Identified by lack of depression on mixed melting point with authentic sample.
[7] None detected by GLC (may be contrasted with product yields of the order of 0.1% which are reported as traces).
[8] Commercially available in a pure grade.
[9] Prepared in situ from 6.0 g. of 50% Co-on-kieselguhr and H$_2$S in excess (50 p.s.i.g. at room temperature).
[10] Experiment run in 170-ml. Magne-Dash autoclave with 52 ml. methanol as solvent.
[11] Bul, palladium sulfide prepared by passing H$_2$S into a solution of palladium chloride in aqueous hydrochloric acid.
[12] Commercially available in a practical grade.
[13] Experiment run in 600-ml. Magne-Dash autoclave with 240 ml. methanol as solvent.
[14] Commercially available in a pure grade.
[15] Commercially available in a pure grade.

Example I

The results of several experiments using various metal sulfide catalysts for the reductive hydrogenation of p-chloronitrobenzene (Expt. Nos. 2–5), o-chloronitrobenzene (Expt. Nos. 7–10), and p-bromonitrobenzene (Expt. Nos. 11–13) to the corresponding halo-substituted aromatic primary amines (haloanilines) are summarized in Table I. Expt. Nos. 1 and 6 utilize a non-sulfided palladium catalyst and are included for the purpose of comparison. The autoclaves used in the experiments are commercially available stainless-steel reaction vessels equipped with temperature and pressure controls. The gas-liquid chromatographic analyses were performed on instruments containing a two meter long column containing 15% Apiezon L grease on 60 to 80 mesh Chromosorb W. Product yields on the order of 0.1% are reported as *traces*.

A detailed description of one experiment (Expt. No. 11) is given to illustrate the basic experimental procedure:

To a 600-ml. Magne-Dash autoclave were added 101 grams (0.50 mole) of p-bromonitrobenzene (commercially available in a pure grade), 240 ml. of methanol as solvent and 1.5 grams of platinum sulfide-on-carbon (5 wt. percent of metal-on-carbon). The autoclave was then sealed and was purged first with nitrogen and then with hydrogen. Hydrogen was added to a pressure of 600 p.s.i.g. and the reaction mixture then was heated with agitation at 500–800 p.s.i.g. for 1 hr. at 100°–130° C. and for 6.5 hrs. at 130° C. At this point, the absorption of hydrogen stopped abruptly at about 99% of the theoretical amount required for reduction. The autoclave was cooled and depressurized, and its contents were filtered to remove the catalyst. The filtrate was made strongly alkaline with dilute sodium hydroxide and was concentrated

Example II

Halo-substituted primary amines, such as those produced in Example I, were reacted with hydrogen and carbonyl-containing compounds selected from the group consisting of aliphatic aldehydes (e.g. butyraldehyde), aromatic aldehydes (e.g., benzaldehyde), aliphatic ketones (e.g., acetone) and alkylaryl ketones (e.g., acetophenone) in the presence of the appropriate catalysts of this invention at temperatures ranging from 50° to 200° C. and pressures ranging from 75 p.s.i.g. to 1,600 p.s.i.g. to produce the corresponding secondary amines. Some of the halo-substituted primary amines were isolated and purified prior to reaction with the hydrogen and carbonyl-containing compounds in the presence of fresh catalyst while others were immediately reacted in situ (i.e., certain experiments of Example I were repeated in the presence of the carbonyl-containing compound). For example, no appreciable amount of dehalogenation occurred when hydrogen, acetone and 1-nitro-4-chloronaphthalene were reacted in the presence of cobalt sulfide to form N-isopropyl-1-amino-4-chloronaphthalene or when hydrogen, benzaldehyde and o-chloroaniline were reacted in the presence of palladium sulfide to form N-benzyl-o-chloroaniline.

A detailed description of one experiment is given to illustrate the basic experimental procedure.

To a 600-mil. Magne-Dash autoclave were added 31.5 grams (0.20 mole) of p-nitrochlorobenzene (commercially available in a practical grade), 158 grams (2.73 moles) of acetone and 2.5 grams of rhodium-on-carbon (5 wt. percent metal-on-carbon). The autoclave was then sealed and was purged first with nitrogen and then with hydrogen. Hydrogen sulfide was added to a pressure of 50 p.s.i.g., and then hydrogen was added to a pressure of 1300 p.s.i.g. The reaction mixture was then heated with agitation for 4.4 hrs. at 180° C. and 1200–1400 p.s.i.g. The autoclave was cooled and depressurized, and the reaction product was then removed. The catalyst was removed by filtration, and the filtrate was distilled up to a liquid (pot temperature of 180° C. at atmospheric pressure. The residue was dissolved in benzene, and the benzene solution thus formed was washed twice with 5% aqueous sodium hydroxide and then twice with water. After removal of the benzene by distillation under reduced pressure, the residue product was shown by weight measurement and gas-liquid chromatographic analysis to contain 34 grams (100% yield) of N-isopropyl-p-chloroaniline. Distillation of this residue gave a yellow oil with the following characteristics: B.P. 100° C. at 5 mm. pressure; M.P. 8°–9° C.; $n_D^{32}$ 1.5470; soluble in hexane, benzene, methanol and carbon tetrachloride; insoluble in cold water, very slightly soluble in hot water. A portion was redistilled for analysis. *Analysis.*—Calcd., for $C_9H_{12}NCl$: C, 63.71; H, 7.13; N, 8.26; Cl, 20.90. Found: C. 64.20; H, 7.19; N, 8.15; Cl, 20.21. Saturation of an ether solution of the residue with gaseous hydrogen chloride produced a product which melted at 159.5°–160.5° C. after two recrystallizations from benzene. *Analysis.*—Calcd. for $C_9H_{13}NCl$: C, 52.44; H, 6.36; N, 6.79; Cl, 34.40. Found: C, 52.99; H, 6.49; N, 6.79; Cl, 33.98.

*Example III*

To a 600-ml. Magne-Dash autoclave were added 103.5 grams (0.54 mole) of 2,5-dichloronitrobenzene (commercially available in a pure grade), 230 ml. of methanol, and 3.0 grams of platinum sulfide-on-carbon (5 wt. percent metal-on-carbon). The autoclave was then sealed and was purged first with nitrogen and then with hydrogen. Hydrogen was added to a pressure of 600 p.s.i.g., and the reaction mixture then was heated for 1¼ hrs. at 85° C. and 500–800 p.s.i.g., at which point gas absorption stopped at approximately the theoretical usage of hydrogen. The autoclave was cooled and depressurized, and its contents filtered to remove the catalyst. The filtrate was made strongly alkaline with dilute sodium hydroxide, and was concentrated by distillation. Benzene was then added, and the remaining methanol was removed by distillation. The benzene solution then was cooled and washed with water. The combined aqueous wash solutions gave a negative silver nitrate test for chloride anion after acidification with dilutenitric acid; thus there had been negligible dehalogenation. The benzene solution was distilled up to a liquid (pot) temperature of 207° C. at atmospheric pressure. The residue was 87 grams (99.5% yield) of 2,5-dichloroaniline, melting at 48–49.5° C., and did not depress the melting point of an authentic sample of 2,5-dichloroaniline.

*Example IV*

Examples I through III were repeated, but this time the catalysts were exposed to a variety of chlorine- and bromine-substituted organic and inorganic compounds; e.g., halobenzenes, alkaline halides, molecular halogens; for one hour at room temperature prior to use in the experiments. No statistically significant differences in the experimental results were noted.

*Example V*

The N-isopropyl-p-chloroaniline of Example II was tested by spraying 250 gallons of an aqueous solution having a concentration of 2000 parts of compound per million parts by weight of solution as a post-emergence herbicide on an acre containing broad-leaf flora (e.g., broad leaf weeds) and narrow-leaf grasses. The compound showed significant and selective activity, being highly effective as a herbicide on the narrow-leaf grasses as demonstrated by the data of Table II, but ineffective on the broad-leaf flora. (The test procedure is described in Example 2 of U.S. Patent 3,029,138.)

TABLE II

| Compound: | Percent Kill of the Narrow-leaf Grasses, average of two results |
|---|---|
| N-isopropyl-p-chloroaniline | 65 |
| None (blank) | 0 |

It should be understood that the precise proportions of materials utilized may be varied, equivalent chemical materials employed and the conditions of reaction varied in accordance with the known principles of thermodynamics and kinetics, if desired, without departing from the spirit and scope of the invention as defined in the below-appended claims.

Having thus described our invention, what we claim and desire to protect by Letters Patent is:

1. The hydrogenation process comprising the steps of (1) effecting the reductive hydrogenation of a bromo-substituted aromatic nitro compound with hydrogen to produce the corresponding bromo-substituted primary aromatic amine; and (2) effecting the reductive alkylation of said bromo-substituted primary aromatic amine with hydrogen and a lower alkyl aldehyde, aryl aldehyde, lower aliphatic ketone or alkylaryl ketone to produce the corresponding bromo-substituted amine; said steps (1) and (2) being conducted in the presence of a catalyst comprising the sulfide of platinum, rhodium, ruthenium or cobalt.

2. The hydrogenation process comprising the steps of (1) effecting the reductive hydrogenation of a chloro-substituted aromatic nitro compound with hydrogen to produce the corresponding chloro-substituted primary aromatic amine; and (2) effecting the reductive alkylation of said chloro-substituted primary aromatic amine with hydrogen and a lower alkyl aldehyde, aryl aldehyde, lower aliphatic ketone or alkylaryl ketone to produce the corresponding chloro-substituted amine; said steps (1) and (2) being conducted in the presence of a catalyst comprising the sulfide of palladium, platinum, rhodium, ruthenium and cobalt.

3. The hydrogenation process comprising effecting the reduction of a bromo-substituted aromatic nitro compound with hydrogen to produce the corresponding bromo-substituted aromatic primary amine in the presence of a catalyst comprising the sulfide of platinum, rhodium, ruthenium or cobalt.

4. The process of claim 3 wherein said catalyst is platinum sulfide.

5. The process of claim 3 wherein said catalyst is rhodium sulfide.

6. The hydrogenation process comprising effecting the reduction of a chloro-substituted aromatic nitro compound with hydrogen to produce the corresponding chloro-substituted aromatic primary amine in the presence of a catalyst comprising the sulfide of palladium, platinum, rhodium, ruthenium or cobalt.

7. The process of claim 6 wherein said catalyst is platinum sulfide.

8. The process of claim 6 wherein said catalyst is rhodium sulfide.

9. The process of claim 6 wherein said catalyst is palladium sulfide.

10. The process of claim 6 wherein said chloro-substituted aromatic nitro compound is p-nitrochlorobenzene.

11. The process of claim 6 wherein the temperature in the reaction zone is maintained at from 90° to 175° C. and the pressure in the reaction zone is maintained at from 300 to 800 p.s.i.g.

12. The hydrogenation process comprising effecting the reductive alkylation of a bromo-substituted aromatic primary amine with hydrogen and a lower alkyl aldehyde, aryl aldehyde, lower aliphatic ketone or alkylaryl ketone to produce the corresponding bromo-substituted aromatic amine in the presence of a catalyst comprising the sulfide of platinum, rhodium, ruthenium or cobalt.

13. The process of claim 12 wherein said catalyst is platinum sulfide.

14. The process of claim 12 wherein said catalyst is rhodium sulfide.

15. The hydrogenation process comprising effecting the reductive alkylation of the chloro-substituted aromatic primary amine with hydrogen and a lower alkyl aldehyde, aryl aldehyde, lower aliphatic ketone, or alkylaryl ketone to produce the corresponding chloro-substituted aromatic amine in the presence of a catalyst comprising a sulfide of palladium, platinum, rhodium, ruthenium or cobalt.

16. The process of claim 15 wherein said catalyst is platinum sulfide.

17. The process of claim 15 wherein said catalyst is rhodium sulfide.

18. The process of claim 15 wherein said catalyst is palladium sulfide.

19. The process of claim 15 wherein said primary amine is p-chloroaniline and said lower aliphatic ketone is acetone, and said secondary amine is N-isopropyl-p-chloroaniline.

20. The process of claim 15 wherein the temperature in the reaction zone is maintained at from 160° to 200° C. and the pressure in the reaction zone is maintained at from 1,000 to 1,600 p.s.i.g.

References Cited

UNITED STATES PATENTS

| | | | |
|---|---|---|---|
| 2,868,847 | 1/1959 | Boyers | 252—472 |
| 2,964,480 | 12/1960 | Schwartz | 252—472 |
| 2,969,394 | 1/1961 | Chenicek | 260—577 |
| 3,055,840 | 9/1962 | Koch | 260—577 |
| 3,209,030 | 9/1965 | Bicek | 260—574 |

OTHER REFERENCES

Koelsch et al.: "Journal Organic Chemistry," vol. 24, pages 1551–3 (1959).

Wedekind et al.: "Ann.," vol. 471, page 109 (1929).

CHARLES B. PARKER, *Primary Examiner.*

R. V. HINES, *Assistant Examiner.*